(No Model.)
J. B. FAUCETTE.
THEODOLITE.
No. 289,401. Patented Dec. 4, 1883.
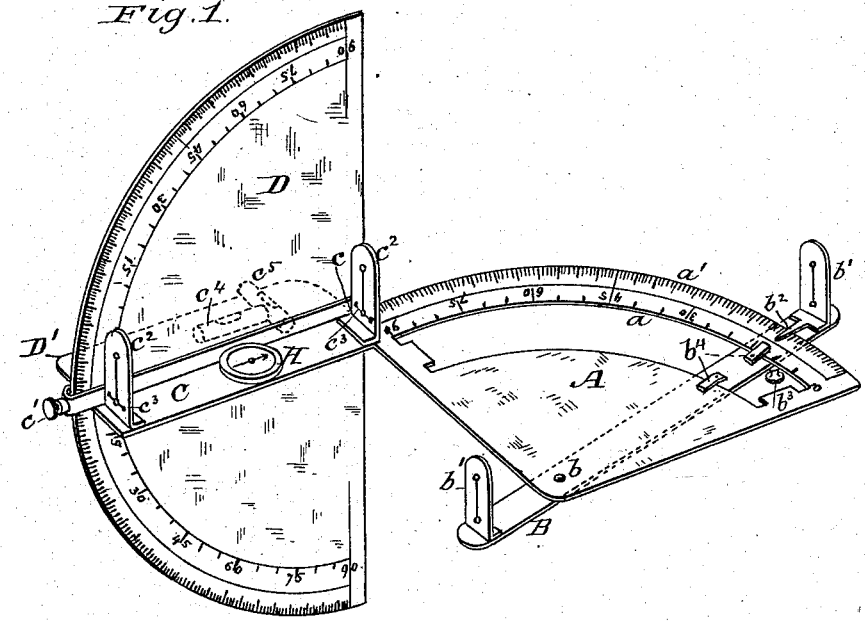
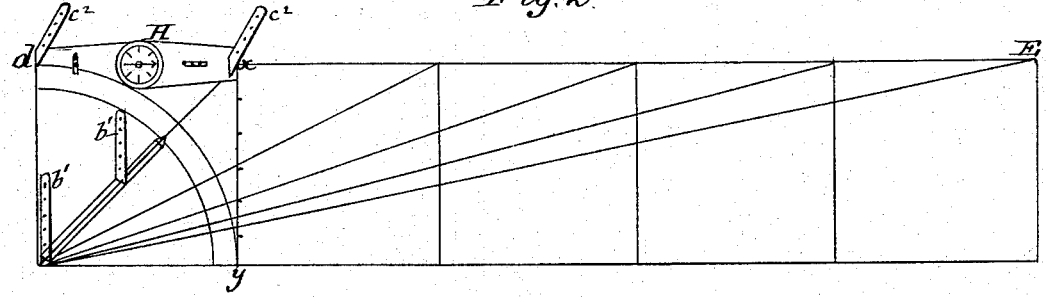
Witnesses:
L. C. Hills
W. B. Masson
Inventor:
James B. Faucette
by E. E. Masson
atty.

UNITED STATES PATENT OFFICE.

JAMES B. FAUCETTE, OF DOVER, ARKANSAS.

THEODOLITE.

SPECIFICATION forming part of Letters Patent No. 289,401, dated December 4, 1883.

Application filed October 6, 1883. (No model.)

*To all whom it may concern:*

Be it known that I, JAMES B. FAUCETTE, a citizen of the United States, residing at Dover, in the county of Pope and State of Arkansas, have invented certain new and useful Improvements in Theodolites, of which the following is a specification, reference being had therein to the accompanying drawings, in which—

Figure 1 is a perspective, and Fig. 2 a plan, of a theodolite constructed in accordance with my invention, the latter figure embodying a diagram illustrating the manner of using the same.

Like letters indicate like parts in all the figures.

My invention relates to that class of instruments in which calculation of distance, elevation, or depression are determined and assisted by the relative position of the parts of the instrument when properly adjusted, and by the indications made by one part upon a scale upon an adjacent part; and my invention consists in certain features of construction and arrangement, hereinafter described, and specifically pointed out in the claims.

A represents a quadrant provided upon its arc with a scale divided at its inner edge, $a$, into degrees, and at its outer edge into divisions relatively proportionate to the six one-inch divisions drawn upon the tangent $x\,y$, Fig. 2, and subdivisions each relatively proportionate to the sixtieth of an inch upon the same tangent.

B represents a sight-bar pivoted at $b$ to the quadrant A, and is provided with the usual sight-standards, $b'$. A pointer, $b^2$, thereon rides the scale $a'$, and a set-screw, $b^3$, is provided to clamp the bar to the arc of the quadrant. Suitable lugs, $b^4$, are formed from or upon the bar B and rest and ride upon the upper surface of the quadrant, the bar itself being arranged against the lower surface of the quadrant.

At one end of the arc of the quadrant A is formed, either integrally with or separately and attached to the same, a frame-work, C, arranged tangentially to the arc of the quadrant A and horizontally in a common plane therewith. The frame C has a clamp and a set-screw, $c'$, for the reception of a semicircle, D, pivotally secured at $c$, and arranged at a right angle to the quadrant A. The set-screw $c'$ is provided to retain the quadrant A in desired position in the frame C. Sight-standards $c^2$, for use in connection with the semicircle D, are arranged upon the platform C. The semicircle D has a central radial flange, D', upon which are spirit-levels $c^4\,c^5$, arranged at right angles to each other. Across the lower aperture in each of the sight-standards $c^2$ is a hair-line, $c^3$, arranged parallel with the base of the frame C. The semicircle D is provided with scales like those upon the quadrant A, and each is a sector of a circle having radius of twenty inches, more or less; and the compass H is provided for indicating bearings and establishing base-lines, as usual.

The operation of my invention is as follows, particular reference being had to Fig. 2: It is proposed to determine the distance from $d$ to a point, E, without its actual measurement. After sighting the object through the standards $c^2$, then sight through the standard-bar $b'$, bringing this bar to a focus upon the object. When the indicator $b^2$ rests at the three-inch mark on the scale $a'$, the proportions of the radius of the quadrant are relatively to that of the scale $a'$ such that by squaring the radius and dividing it by the indications of the focus-bar the quotient will be the distance sought in feet; hence $20\times20=400\div3=133$, the distance from $d$ to E. If it is desired to measure the height of an object at a distance, the vertical semicircle D is brought into requisition. The change in the position of the instrument being vertical instead of to one side, the semicircle D is depressed until the central radial flange, C', which bears the spirit-level, is sighted along and found to be in line with the object, when the degrees of depression are indicated by a pointer on the outer end, are read off, and made the basis of the calculation in the same manner as heretofore described in calculating distance, the relative proportion of the degree-scale and the radius of the sector being such as to indicate the distance by the extent of the depression for each degree of change in position of the instrument.

The mechanical principle involved in this apparatus, together with rules for making computations, may be embodied in text-books, and are intended to be supplied with the apparatus.

Having described my invention and its operation, what I claim as new, and desire to secure by Letters Patent, is—

1. The combination of the quadrant A, its stationary sight-standards $c^2$ and movable sight-bar B, and the pivoted semicircle D, arranged at right angle thereto, substantially as shown and described.

2. The combination of the quadrant A, the semicircle D, provided with the radial flange D', bearing spirit-levels $c^4$ $c^5$, and the frame C, bearing the sight-standards $c^2$, substantially as shown and described.

3. The combination of the quadrant A, semicircle D, provided with flanges D' and pivoted at $c$, and the set-screw $c'$, substantially as shown and described.

4. The combination of the quadrant A, its tangential sight-standards $c^2$, the sight-bar B, lugs $b^4$, set-screws $b^3$, and the sight-vanes $b'$, substantially as shown and described.

In testimony whereof I affix my signature in presence of two witnesses.

JAMES B. FAUCETTE.

Witnesses:
J. P. WOOD,
W. C. RENFROW.